US010320928B1

(12) United States Patent
McDonnell et al.

(10) Patent No.: US 10,320,928 B1
(45) Date of Patent: Jun. 11, 2019

(54) MULTI COMPUTING DEVICE NETWORK BASED CONVERSION DETERMINATION BASED ON COMPUTER NETWORK TRAFFIC

(71) Applicant: Google Inc., Mountain View, CA (US)

(72) Inventors: Philip Andrew McDonnell, San Franciso, CA (US); Shobhit Saxena, Sunnyvale, CA (US); Subhadip Sarkar, Sunnyvale, CA (US); Lu Liu, Cupertino, CA (US); Shibani Sanan, Saratoga, CA (US); Puneet Gupta, Mountain View, CA (US)

(73) Assignee: Google LLC, Mountain View, CA (US)

( * ) Notice: Subject to any disclaimer, the term of this patent is extended or adjusted under 35 U.S.C. 154(b) by 158 days.

(21) Appl. No.: 15/331,303

(22) Filed: Oct. 21, 2016

Related U.S. Application Data

(63) Continuation of application No. 13/942,640, filed on Jul. 15, 2013, now abandoned.
(Continued)

(51) Int. Cl.
*G06Q 30/02* (2012.01)
*H04L 29/08* (2006.01)

(52) U.S. Cl.
CPC ......... *H04L 67/22* (2013.01); *G06Q 30/0242* (2013.01); *G06Q 30/0277* (2013.01);
(Continued)

(58) Field of Classification Search
CPC ........... G06Q 30/0277; G06Q 30/0242; G06Q 30/0244; G06Q 30/0276; G06Q 30/0251; G06Q 30/02
See application file for complete search history.

(56) References Cited

U.S. PATENT DOCUMENTS

2005/0071218 A1  3/2005 Lin et al.
2011/0225640 A1  9/2011 Ganapathy et al.
(Continued)

OTHER PUBLICATIONS

Kannan et al. "The path to purchase and attribution modeling: Introduction to special section" International Journal of Research in Marketing 33 (2016) 449-456 (Year: 2016).*
(Continued)

*Primary Examiner* — David R Lazaro
(74) *Attorney, Agent, or Firm* — Foley & Lardner LLP

(57) ABSTRACT

Multi-computing device network based cross-device conversion determination is described. A content selection computer server can identify cross-device conversions. A first computing device accesses third-party content via a first computer network connection. A second computing device accesses a webpage of the third-party content provider via a second computer network connection. The first and devices can be logged into a same online account. The content selection computer server can obtain, via a content tag that includes a script that executes on a webpage that includes the third-party content, data indicating that the first computing device accessed the third-party content. The selection computer server determines the conversion from the content tag and the second computing device having accessed the webpage. Based on a percentage of first and second sets of computing devices that have logged into common respective online accounts, the content selection computer server extrapolates an estimated number of cross-device conversions.

20 Claims, 6 Drawing Sheets

Related U.S. Application Data

(60) Provisional application No. 61/832,605, filed on Jun. 7, 2013.

(52) U.S. Cl.
CPC ............ *H04L 67/20* (2013.01); *G06Q 30/02* (2013.01); *G06Q 30/0251* (2013.01); *H04L 67/306* (2013.01)

(56) References Cited

U.S. PATENT DOCUMENTS

| | | | | |
|---|---|---|---|---|
| 2011/0231240 | A1* | 9/2011 | Schoen | G06Q 30/0242 705/14.41 |
| 2014/0365296 | A1* | 12/2014 | McDonnell | G06Q 30/0246 705/14.45 |
| 2015/0142551 | A1* | 5/2015 | Papakipos | G06Q 30/0277 705/14.41 |
| 2016/0239868 | A1* | 8/2016 | Demsey | H04W 4/029 |
| 2016/0267524 | A1* | 9/2016 | Ng | G06Q 30/0244 |
| 2016/0267526 | A1* | 9/2016 | Xu | G06Q 30/0246 |

OTHER PUBLICATIONS

Ozturk, R. "A New Approach for Reaching the Customer of the Digital Age: Cross-Device Advertising" Journalism and Mass Communication, Jan. 2016, vol. 6, No. 1, 19-25 (Year: 2016).*

"How to Write Advertisements that Sell," A.W. Shaw Co., from System, the magazine of Business, dated 1912, downloaded from http://library.duke.edu/digitalcollections/eaa_ 00050/ on Feb. 21, 2015 (45 pages).

Bulygin, "Cross-Device Conversion Tracking Announced by Google," Web Article, Feb. 13, 2013, Trendblog.net (6 pages).

Coren, "Understanding Google Analytics Multi Channel Funnels," downloaded from http://onlinebehavior.com/analytics/multi-channel-funnels, dated Mar. 2012, downloaded Aug. 15, 2016 (8 pages).

Darwell, "Facebook conversion tracking goes live for all ad accounts," Web Article, Jan. 22, 2013, Inside Facebook (7 pages).

Kaushik, "Dear Avinash: Attribution Modeling, Org Culture, Deeper Analysis," downloaded from http://www.kaushik.net.avinash/multi-channel-attribution-data-culture-analysis-faq/, dated Aug. 13, 2012 (see p. 16), downloaded on Aug. 14, 2016 (27 pages).

Kaushik, "Multi-Channel Attribution: Definitions, Models, and Reality Check," downloaded from http://www.kaushik.net.avinash/multi-channel-attribution-definitions-models, dated Apr. 2, 2012 (see p. 8), downloaded Aug. 15, 2016 (58 pages).

No Author, "Four Reasons to Get Excited About Facebook Conversion Tracking," Web Article, Feb. 8, 2013, Optimal (3 pages).

Quadlin, "Facebook conversion tracking: the good, the bad, the cloudy," Web Article, Mar. 11, 2013, PPG.com. (11 pages).

Rodgers, "Product Manager David Baser on Facebook's Attribution Roadmap," Web Article, Jan. 23, 2013, (6 pages).

Sim, "Conversion Measurement: A Win for Direct Response Marketers," Web Article, Jan. 22, 2013, Facebook Studio Blog (4 pages).

Thomas, "Facebook Has Opened A New Front in Its War With Google for The Future of Advertising," Web Article, Jan. 27, 2013, Business Insider (6 pages).

U.S. Office Action on U.S. Appl. No. 13/942,640 dated Aug. 23, 2016 (19 pages).

Vigneron, "A Look At Cross-Device Search & Conversion," Web Article, Jun. 20, 2012 (4 pages).

* cited by examiner

US 10,320,928 B1

MULTI COMPUTING DEVICE NETWORK BASED CONVERSION DETERMINATION BASED ON COMPUTER NETWORK TRAFFIC

RELATED APPLICATIONS

The present application claims priority as a continuation application under 35 U.S.C. § 120 to U.S. patent application Ser. No. 13/942,640, titled "Cross-Device Conversion Estimates" filed Jul. 15, 2013, which claims priority under 35 U.S.C. § 119 to provisional U.S. Patent Application 61/832,605, filed Jun. 7, 2013 and titled "Cross-Device Conversion Estimates", each of which is hereby incorporated by reference.

BACKGROUND

Multiple computing devices can access content via multiple computer network connections on one or more different computer networks at different times. Online content may be received at multiple computing devices from various first-party or third-party sources. First-party content can include the primary online content requested or displayed by a user's device. For example, first-party content may be a webpage requested by the client or a stand-alone application running on a computing device. Third-party content can include additional content that may be provided in conjunction with the first-party content. A computer system that accesses computer network data may be unable to efficiently determine related computer network activity between multiple different computing devices that can occur during multiple, different computer network sessions established with the respective computing devices.

SUMMARY

Implementations of the systems and methods for cross-device conversion estimates are disclosed herein. One implementation is a method of estimating a number of conversions. The method includes determining, by one or more processors, a number of observed interactions with third-party content by a first set of devices. The method also includes determining, by the one or more processors, a number of observed cross-device conversions associated with the interactions based on a portion of the first set of devices and a second set of devices having logged into the same online accounts. The method further includes determining, by the one or more processors, a percentage of the first set of devices that have logged into the same online accounts as the second set of devices. The method additionally includes calculating, by the one or more processors, an estimated total number of cross-device conversions based on the number of observed cross-device conversions and the percentage of the first set of devices that have logged into the same online accounts as the second set of devices. The method yet further includes providing the estimated total number of cross-device conversions for display.

Another implementation is a system for estimating a number of conversions. The system includes one or more processors configured to determine a number of observed interactions with third-party content by a first set of devices. The one or more processors are also configured to determine a number of observed cross-device conversions associated with the interactions based on a portion of the first set of devices and a second set of devices having logged into the same online accounts. The one or more processors are also configured to determine a percentage of the first set of devices that have logged into the same online accounts as the second set of devices. The one or more processors are additionally configured to calculate an estimated total number of cross-device conversions based on the number of observed cross-device conversions and the percentage of the first set of devices that have logged into the same online accounts as the second set of devices. The one or more processors are further configured to provide the estimated total number of cross-device conversions for display.

A further implementation is a computer-readable storage medium having machine instructions stored therein, the instructions being executable by a processor to cause the processor to perform operations. The operations include determining a number of observed interactions with third-party content by a first set of devices. The operations also include determining a number of observed cross-device conversions associated with the interactions based on a portion of the first set of devices and a second set of devices having logged into the same online accounts. The operations further include determining a percentage of the first set of devices that have logged into the same online accounts as the second set of devices. The operations also include calculating an estimated total number of cross-device conversions based on the number of observed cross-device conversions and the percentage of the first set of devices that have logged into the same online accounts as the second set of devices. The operations yet further include providing the estimated total number of cross-device conversions for display.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
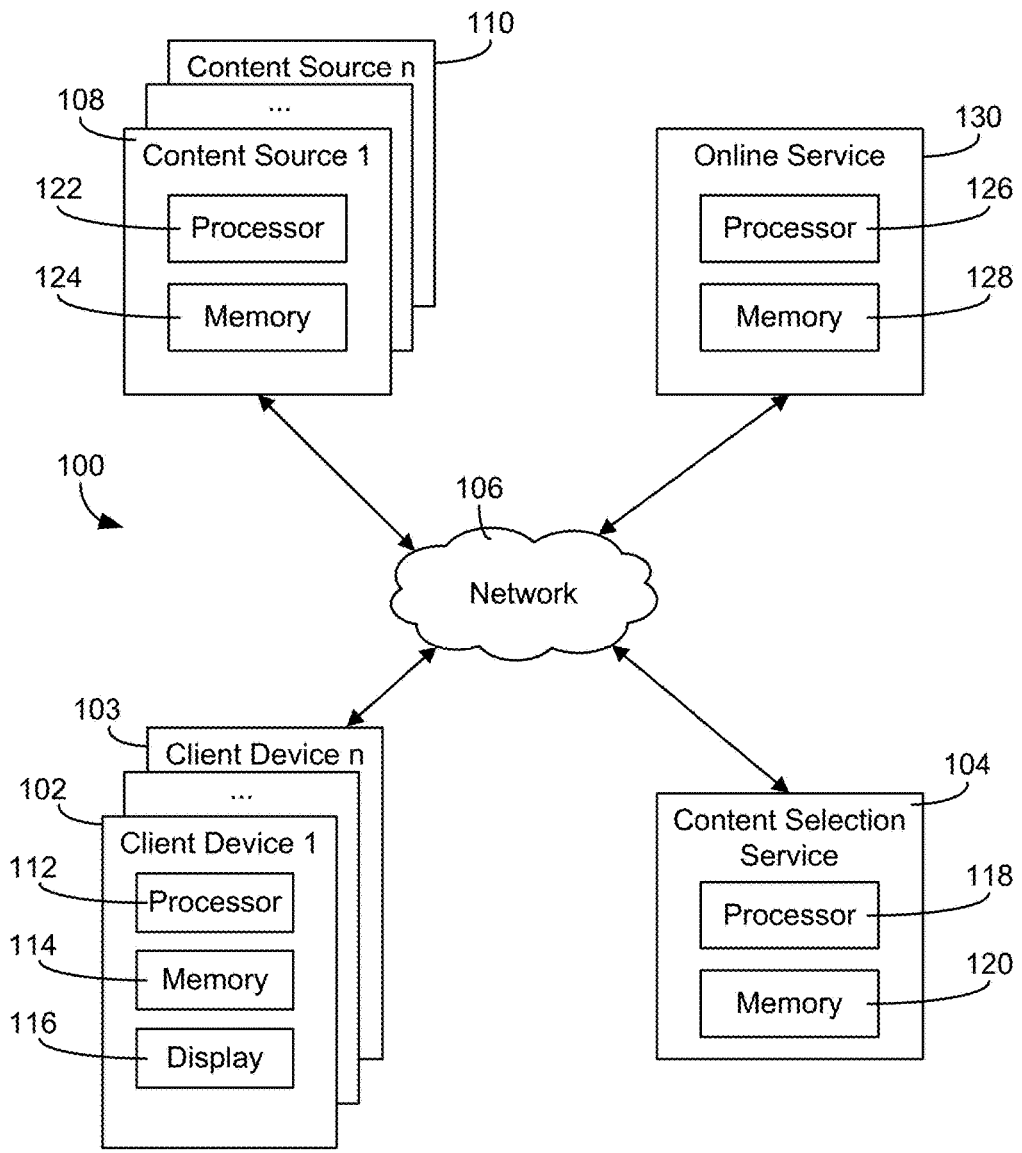
FIG. 1 is a block diagram of an implementation of a computer system in which third-party content is selected for presentation with first-party content.

According to various aspects of the present disclosure, a first-party content provider may allow a content selection service to determine which third-party content is to be provided in conjunction with the first-party provider's content. In exchange for doing so, the first-party content provider may receive a portion of any revenues collected by the content selection service from third-party content providers. For example, a website operator may allow third-party ads to be selected by a content selection service for placement on the pages of the website. In turn, the content selection service may charge the third-party content providers that place content on the website a certain amount and apportion a percentage of this amount to the first-party content provider.

Various metrics may be determined by a content selection service regarding the performance of content from a third-party content provider. One metric may be the number of impressions for the third-party content, e.g., the number of times the third-party content was selected by the content selection service and presented at client devices. Some performance metrics determined by the content selection service may correspond to actions performed by users after being presented the third-party content. In some implementations, data regarding user actions may be reported back to the content selection service by the client devices at which the third-party content is presented. For example, cookies may be used by the content selection service to determine whether a user interacted with the third-party content (e.g., the user clicked on the third-party content, the user played a third-party video, etc.). In another example, cookies may be used to record whether a user of a client device performs a conversion (e.g., a specific action desired by the third-party content provider in response to the user being presented the third-party content). For example, a conversion may correspond to the user being presented with a third-party ad and then making a purchase on the third-party content provider's website, signing up for alerts from the third-party content provider, downloading software from the third-party content provider, or performing any other form of action desired by the third-party content provider and prompted by the third-party content.

According to various implementations, a content selection service may be configured to determine the number of cross-device conversions associated with third-party content. Since cookies are specific to a device, for conversions that occur on a different device than the device that received the third-party content, the content selection will be unable to associate the conversion with the presentation of the third-party content. In various implementations, the content selection service may identify cross-device conversions based on two or more devices having logged into the same online account. An online account may be any unique online account for an online service, such as a social networking service, a search service, a file sharing service, a messaging service, a gaming service, an online forum, a particular website or set of websites, or the like. By tying an online action (e.g., a click on an ad, a conversion, etc.) to an online account, online actions performed by multiple users of the same device may also be recorded and distinguished from one another. In some implementations, the code for the first-party content and for the website of the third-party content provider (e.g., webpage code) may be configured to report back to the online service which webpages are loaded. If the device is logged into an account of the online service, the visit may be associated with the online account in addition to the being associated with just the device. In one example, assume that a user is logged into her account on a social networking service via a mobile device when a third-party ad for snowshoes is presented to her. Also assume that she later visits the third-party content provider's website using her desktop computer at home and purchases the snowshoes (e.g., she completes a conversion using a different device). If her desktop device is also logged into her social networking account at the time of the conversion, the content selection service may attribute the cross-device conversion to the third-party content.

A content selection service may be configured to determine an estimate of the total number cross-device conversions associated with third-party content, in one implementation. In some cases, there may be additional cross-device conversions that are unobservable due to the users not being logged into accounts of the online service when an event associated with the third-party content occurs (e.g., the third-party content is presented, the user clicks on the third-party content and is redirected to the website of the third-party content provider, the user completes a conversion, etc.). Such users may be logged into their accounts on only one device, not logged into their accounts on any devices when the events occur, or may not even have accounts with the online service. Regardless of the reason for the cross-device conversions being unobservable, the content selection service may extrapolate out the observed cross-device conversions to estimate the total number of observed and unobserved cross-device conversions associated with the third-party content. In one implementation, the content selection service may store data regarding the number or percentage of users that are logged into the same accounts across multiple devices. For example, the content selection service may determine that 20% of users on average are logged into both mobile and desktop devices. Based on this value and the number of observed cross-device conversions, the content selection service may determine an estimated total number of cross-device conversions that takes into account any unobserved cross-device conversions. In some implementations, the content selection service may use the estimated number of cross-device conversions to determine an estimated total number of conversions associated with the third-party content (e.g., both single device and cross-device conversions). The estimated number of cross-device and/or total conversions may be presented to the third-party content provider, thereby allowing the third-party content provider to assess the performance of the third-party content.

Referring to FIG. 1, a block diagram of a computer system 100 in accordance with a described implementation is shown. System 100 includes client devices 102-103 (e.g., a first through nth client device) which communicates with other computing devices via a network 106. Client devices 102-103 may execute web browsers or other applications (e.g., video games, messenger programs, media players, social networking applications, etc.) to retrieve content from other devices over network 106. For example, client devices 102-103 may communicate with any number of content sources 108-110 (e.g., a first content source through nth content source). Content sources 108-110 may provide webpage data and/or other content, such as images, video, and audio, to client devices 102-103. Computer system 100 may also include an online service 130 which is configured to allow users to create and maintain accounts with online service 130. Computer system 100 may further include a content selection service 104 configured to select third-party content to be provided to client devices 102-103. For example, content source 108 may provide a first-party webpage to client device 102 that includes additional third-party content selected by content selection service 104.

Network 106 may be any form of computer network that relays information between client devices 102-103, content sources 108-110, online service 130, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client devices 102-103 may be any number of different types of user electronic devices configured to communicate via network 106 (e.g., laptop computers, desktop computers, tablet devices, smart phones, digital video recorders, set-top boxes for televisions, video game consoles, combinations thereof, etc.). In some implementations, the types of client devices 102-103 may be categorized as being mobile devices, desktop devices (e.g., devices intended to remain stationary or configured to primarily access network 106 via a local area network), tablet devices, or any other category of electronic devices. In one example, client device 102 may be a mobile device and client device 103 may be a desktop device. Each of client devices 102-103 includes a processor and a memory coupled thereto that stores machine instructions executable by the processor. As shown, client device 102 include a processor 112 and a memory 114. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client devices 102-103 may each include one or more user interface devices. A user interface device may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housings of client devices 102-103 (e.g., built-in display, microphone, etc.) or external to the housings of client device 102-103 (e.g., a monitor connected to client device 102, a speaker connected to client device 102, etc.), according to various implementations. For example, client device 102 may include an electronic display 116, which displays webpages and other data received from content sources 108-110, online service 130, and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108-110 may each be one or more electronic devices connected to network 106 that provide content to devices connected to network 106. For example, content sources 108-110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, other forms of electronic documents, and applications executable by client devices 102-103. For example, content source 108 may be an online search engine that provides search result data to client device 102 in response to a search query. In another example, content source 110 may be a first-party web server that provides webpage data to client device 102 in response to a request for the webpage. Similar to client devices 102-103, content sources 108-110 may each include a processor in communication with a memory that stores machine instructions executable by the processor. As shown, for example, content source 108 may include a processor 122 and a memory 124 that stores machine instructions executable by processor 122. For example, processor 122 may execute instructions to serve web pages to client devices 102-103 via network 106.

According to various implementations, content sources 108-110 may provide first-party webpage data to client device 102 that includes one or more content tags. In general, a content tag refers to any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108-110, content selection service 104, etc.), a network location (e.g., a universal resource locator (URL)) associated with clicking on the third-party content, how the third-party content is to be rendered on a display, a command that causes client devices 102-103 to set browser cookies (e.g., via pixel tags that set cookies via image requests sent from client devices 102-103 to content selection service 104), one or more keywords used to retrieve the third-party content, and other functions associated with providing third-party content with a first-party webpage. For example, content source 108 may serve first-party webpage data to client device 102 that causes client device 102 to retrieve third-party content from content selection service 104. In another implementation, content may be selected by content selection service 104 and provided by content source 108 as part of the first-party webpage data sent to client device 102. In a further example, content selection service 104 may cause client device 102 to retrieve third-party content from a specified location, such as memory 114 or content sources 108-110.

Content selection service 104 may also be one or more electronic devices connected to network 106. Content selection service 104 may be a computer server (e.g., an FTP server, a file sharing server, a web server, etc.) or a combination of servers (e.g., a data center, a cloud computing platform, etc.). Content selection service 104 may include a processor 118 and a memory 120 that stores program instructions executable by processor 118. When the instructions stored in memory 120 are executed by processor 118, processor 118 is configured to perform the operations described herein. In cases in which content selection service 104 is a combination of computing devices, processor 118 may represent the collective processors of the devices and memory 120 may represent the collective memories of the devices.

Content selection service 104 may be configured to select third-party content for client devices 102-103 (i.e., content selection service 104 may provide a third-party content selection service to client devices 102-103). In one implementation, the selected third-party content may be provided by content selection service 104 to client device 102 via network 106. For example, content source 110 may upload the third-party content to content selection service 104. Content selection service 104 may then provide the third-party content to client device 102 to be presented in conjunction with first-party content provided by any of content sources 108-110. In other implementations, content selection service 104 may provide an instruction to client device 102 that causes client device 102 to retrieve the selected third-party content (e.g., from memory 114 of client device 102, from content source 110, etc.). For example, content selection service 104 may select third-party content to be provided as part of a first-party webpage being visited by client device 102 or within a first-party application being executed by client device 102 (e.g., within a game, messenger application, etc.).

Content selection service 104 may be configured to select content based on a device identifier associated with client device 102. In general, a device identifier refers to any form of data that may be used to represent a device or software that receives content selected by content selection service 104. In some implementations, a device identifier may be associated with one or more other device identifiers (e.g., a device identifier for a mobile device, a device identifier for a home computer, etc.). Device identifiers may include, but are not limited to, cookies, device serial numbers, user profile data, or network addresses. For example, a cookie set on client device 102 may be used to identify client device 102 to content selection service 104.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by content selection service 104 and presented to the user. Certain data, such as a device identifier, may be anonymized in one or more ways before it is stored or used, so that personally identifiable information is removed when generating parameters (e.g., demographic parameters) used by content selection service 104 to select third-party content. For example, a device identifier for client device 102 may be anonymized so that no personally identifiable information about its corresponding user can be determined by content selection service 104 from it. In another example, a user's geographic location may be generalized where location information is obtained (such as to a city, ZIP code, or state level), so that a precise location of the user cannot be determined. Thus, the user of client device 102 may have control over how information is collected about him or her and used by content selection service 104.

If the user of client device 102 has elected to allow content selection service 104 to use information regarding him or her, content selection service 104 may use history data associated with a device identifier to select relevant content for the corresponding user. History data may be any data associated with a device identifier that is indicative of an online event (e.g., visiting a webpage, interacting with presented content, conducting a search, making a purchase, downloading content, etc.). Based in part on the analyzed history data, content selection service 104 may select third-party content to be provided in conjunction with first-party content (e.g., as part of a displayed webpage, as a pop-up, within a video game, within another type of application, etc.). Additional data associated with a device identifier may include, but is not limited to, the device type of client device 102 (e.g., whether client device 102 is a desktop or mobile device), the location of client device 102, or a search query generated by client device 102. For example, content selection service 104 may select third-party content to be provided as part of a first-party webpage or in conjunction with search results from one of content sources 108-110.

Content selection service 104 may analyze the history data associated with a device identifier to identify one or more topics that may be of interest to a user. For example, content selection service 104 may perform text and/or image analysis on a webpage from content source 108, to determine one or more topics of the webpage. In some implementations, a topic may correspond to a predefined interest category used by content selection service 104. For example, a webpage devoted to the topic of golf may be classified under the interest category of sports. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category. Similarly, content selection service 104 may analyze the content of a first-party webpage accessed by client device 102 to identify one or more topical categories for the webpage. For example, content selection service 104 may use text or image recognition on the webpage to determine that the webpage is devoted to the topical category of /Sports/Golf.

Content selection service 104 may receive history data indicative of one or more online events associated with a device identifier. In implementations in which a content tag causes client device 102 to request content from content selection service 104, such a request may include a device identifier for client device 102 and/or additional information (e.g., the webpage being loaded, the referring webpage, etc.). For example, content selection service 104 may receive and store history data regarding whether or not third-party content provided to client device 102 was selected using an interface device (e.g., the user of client device 102 clicked on a third-party hyperlink, third-party image, etc.). Content selection service 104 may store such data to record a history of online events associated with a device identifier. In some cases, client device 102 may provide history data to content selection service 104 without first executing a content tag. For example, client device 102 may periodically send history data to content selection service 104 or may do so in response to receiving a command from a user interface device. In some implementations, content selection service 104 may receive history data from content sources 108-110. For example, content source 108 may store history data regarding web transactions with client device 102 and provide the history data to content selection service 104.

According to various implementations, content selection service 104 may be configured to associate an online event regarding third-party content with an account maintained by online service 130. In one implementation, content tags on webpages served by content sources 108-110 may be configured to cause client devices 102-103 to report data to online service 130 when particular webpages are loaded. If the corresponding client device is logged into an account with online service 130 at the time, online service 130 may record the online event and associate it with the logged-in account. Online service 130 may be any form of online service that allows users to create unique accounts, such as an email service, an application marketplace, a social networking service, a messaging service, an online forum, or the like. Similar to the other devices on network 106, online service 130 includes a processor 126 that executes instructions stored in a memory 128 to perform the operations described herein. Content selection service 104 may receive any recorded online actions from online service 130. In some implementations, content selection service 104 and online service 130 may be provided by the same business entity or the same online service (e.g., online service 130 may be a search engine that allows users to create accounts and also provides a content selection service).

Content selection service 104 may apply one or more weightings to an interest or product category, to determine whether the category is to be associated with a device identifier or account with online service 130. For example, content selection service 104 may impose a maximum limit to the number of product or interest categories associated with a device identifier. The top n-number of categories having the highest weightings may then be selected by content selection service 104 to be associated with a particular device identifier. A category weighting may be based on, for example, the number of webpages visited by the device identifier regarding the category, when the visits occurred, how often the topic of the category was mentioned on a visited webpage, or any online actions performed by the device identifier regarding the category. For example, topics of more recently visited webpages may receive a higher weighting than webpages that were visited further in the past. Categories may also be subdivided by the time periods in which the webpage visits occurred. For example, the interest or product categories may be subdivided into long-term, short-term, and current categories, based on when the device identifier visited a webpage regarding the category.

Content selection service 104 may be configured to conduct a content auction among third-party content providers to determine which third-party content is to be provided to client devices 102-103. For example, content selection service 104 may conduct a real-time content auction in response to client device 102 requesting first-party content from one of content sources 108-110 or executing a first-party application. Content selection service 104 may use any number of factors to determine the winner of the auction. For example, the winner of a content auction may be based in part on the third-party provider's bid and/or a quality score for the third-party provider's content (e.g., a measure of how likely the user of client device 102 is to click on the content). In other words, the highest bidder is not necessarily the winner of a content auction conducted by content selection service 104, in some implementations.

Content selection service 104 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at one or more of client devices 102-103. In other words, the bid amount may be on a cost per impression or cost per thousand impressions (CPM) basis. In further cases, a bid amount may correspond to a specified action being performed in response to the third-party content being presented at a client device. For example, a bid amount may be a monetary amount that the third-party content provider is willing to pay, should their content be clicked on at the client device, thereby redirecting the client device to the provider's webpage. In other words, a bid amount may be a cost per click (CPC) bid amount. In another example, the bid amount may correspond to an action being performed on the third-party provider's website, such as the user of client device 102 making a purchase (e.g., a conversion). Such bids are typically referred to as being on a cost per acquisition (CPA) or cost per conversion basis.

A campaign created via content selection service 104 may also include selection parameters that control when a bid is placed on behalf of a third-party content provider in a content auction. If the third-party content is to be presented in conjunction with search results from a search engine, for example, the selection parameters may include one or more sets of search keywords. For example, the third-party content provider may only participate in content auctions in which a search query for "golf resorts in California" is sent to a search engine. Other example parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an ad selling golf equipment may specify that they wish to place an ad on the sports page of an particular online newspaper.

Content selection service 104 may be configured to generate performance metrics regarding third-party content selected by the service for presentation by client devices 102-103. Performance metrics may include, but are not limited to, metrics regarding how many times the third-party content was selected and presented (e.g., an impression count), how many times the users of client devices 102-103 interacted with the third-party content (e.g., by clicking on the content and being redirected to a landing webpage of the third-party content provider, by playing a third-party video or audio file selected by content selection service 104, etc.), and/or how many times the third-party content resulted in a conversion (e.g., the users of client devices 102-103 performed a desired action in response to being presented the third-party content). Performance metrics determined by content selection service 104 may also include statistics based on recorded online events associated with the third-party content. In some cases, content selection service 104 may determine a click through rate (e.g., the percentage of times the third-party content was clicked at client devices 102-103 in relation to the number of times the third-party content was presented at client devices 102-103). Another statistic that content selection service 104 may determine is a conversion rate (e.g., the percentage of times the users of client devices 102-103 performed a particular action in response to being presented the third-party content in relation to the number of times the third-party content was presented).

In one implementation, content selection service 104 may be configured to determine a number of cross-device conversions based on two or more devices involved in the conversion process being logged into the same account with online service 130. Content selection service 104 may receive data from online service 130 regarding whether or not client devices 102-103 are logged into accounts. Content selection service 104 may also receive history data from online service 130 regarding online actions performed by client devices 102-103 (e.g., a device was used to click on the third-party content, a device was used to make a purchase at the website of the third-party content provider, etc.). For example, assume that client device 102 is a desktop device that is logged into an account of online service 130 when third-party content is provided to client device 102 by content selection service 104. If the third-party content is clicked and client device 102 is redirected to a landing webpage of the third-party content provider (e.g., a webpage served by content source 110), the landing webpage may include code that causes client device 102 to report the redirect to online service 130. Thus, the click may be associated with the account, since client device 102 was logged into the account at the time. Similarly, assume that client device 103 is a desktop device operated by the same user as client device 102 and is also logged into the same account of online service 130. If the user revisits the website of the third-party content provider at a later time and completes a conversion, the conversion may also be associated with the account and attributed back to the presentation of the third-party content at client device 102, even though the conversion was performed across the devices.

Content selection service 104 may be configured to estimate a total number of cross-device conversions and/or a total number of conversions (e.g., single and cross-device conversions) based on the recorded conversions. In one implementation, content selection service 104 may use an observed percentage of one device type to another where one of each type of devices is logged into the same account with online service 130. For example, content selection service 104 may receive data from online service 130 regarding mobile devices that have logged into the same accounts as desktop devices. Using this data and the observed cross-device conversions, content selection service 104 may estimate the total number of cross-device conversions for third-party content. In one implementation, content selection service 104 may also use the estimated total number of cross-device conversions to determine an estimated total number of conversions associated with the third-party content. Content selection service 104 may provide any of the generated metrics regarding third-party content via network 106 to a device associated with a third-party content provider. For example, content selection service 104 may serve a performance report that includes performance metrics for a third-party content provider's campaign on content selection service 104.

Figure 2A:
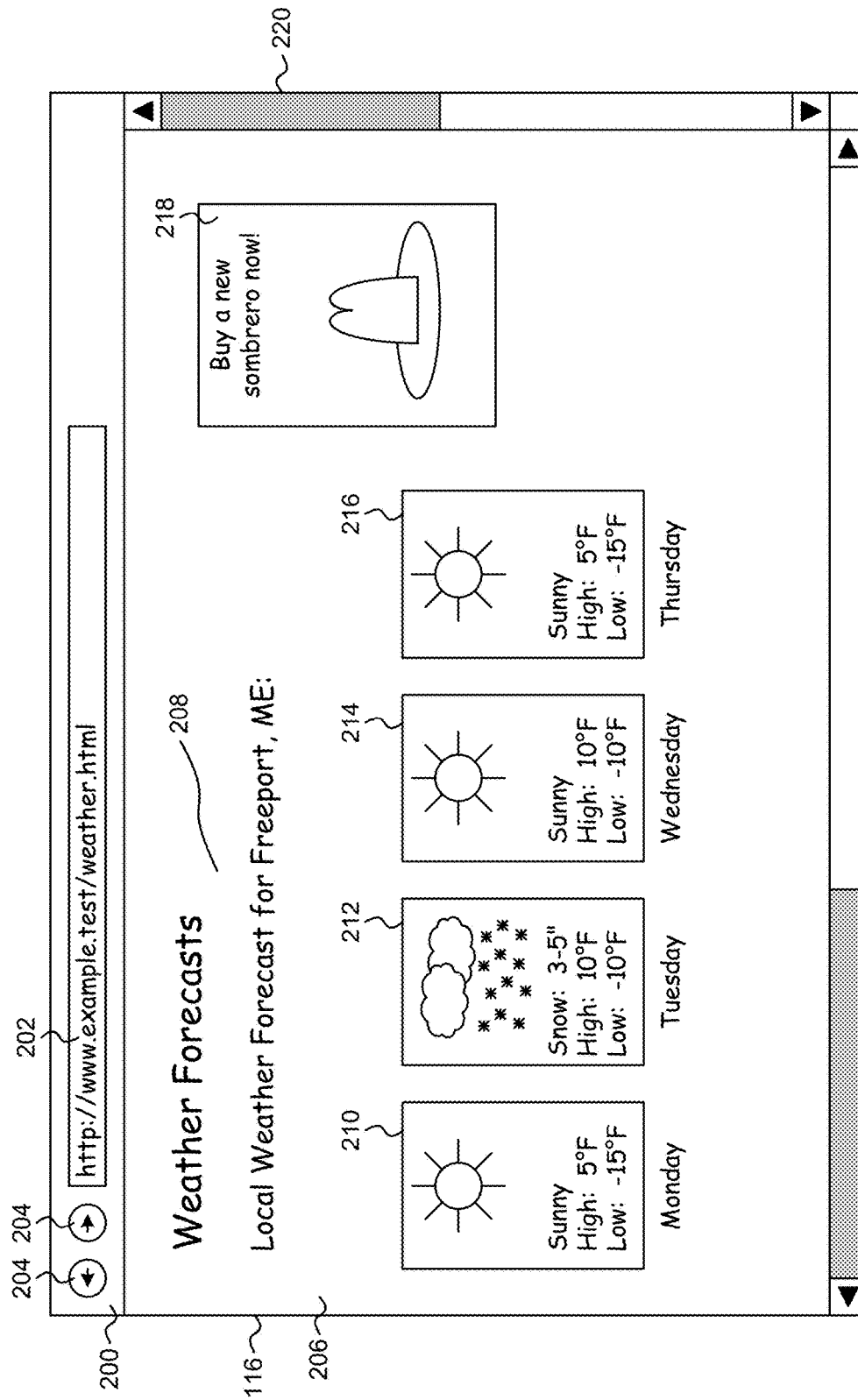
FIG. 2A is an illustration of a one implementation of an electronic display showing a first-party webpage with embedded third-party content.

Referring now to FIG. 2A, an illustration is shown of electronic display 116 displaying an example first-party webpage 206. Electronic display 116 is in electronic communication with processor 112 which causes visual indicia to be displayed on electronic display 116. As shown, processor 112 may execute a web browser 200 stored in memory 114 of client device 102, to display indicia of content received by client device 102 via network 106. In other implementations, another application executed by client device 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, the URL, http://www.example.test/weather.html, may be entered into field 202. Processor 112 may use the inputted URL to request data from a content source having a network address that corresponds to the entered URL. In other words, client device 102 may request first-party content accessible at the inputted URL. In response to the request, the content source may return webpage data and/or other data to client device 102. Web browser 200 may analyze the returned data and cause visual indicia to be displayed by electronic display 116 based on the data.

In general, webpage data may include text, hyperlinks, layout information, and other data that may be used to provide the framework for the visual layout of first-party webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2A may include a file, "weather.html" provided by the website, "www.example.test." The webpage data may include data that specifies where indicia appear on first-party webpage 206, such as text 208. In some implementations, the webpage data may also include additional URL information used by web browser 200 to retrieve additional indicia displayed on first-party webpage 206. For example, the file, "weather.html," may also include one or more instructions used by processor 112 to retrieve images 210-216 from their respective content sources.

Web browser 200 may include a number of navigational controls associated with first-party webpage 206. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of first-party webpage 206 that are currently off-screen. For example, first-party webpage 206 may be formatted to be larger than the screen of electronic display 116. In such a case, the one or more scroll bars 220 may be used to change the vertical and/or horizontal position of first-party webpage 206 on electronic display 116.

First-party webpage 206 may be devoted to one or more topics. For example, first-party webpage 206 may be devoted to the local weather forecast for Freeport, Me. In some implementations, a content selection server, such as content selection service 104, may analyze the contents of first-party webpage 206 to identify one or more topics. For example, content selection service 104 may analyze text 208 and/or images 210-216 to identify first-party webpage 206 as being devoted to weather forecasts. In some implementations, webpage data for first-party webpage 206 may include metadata that identifies a topic.

In various implementations, content selection service 104 may select some of the content presented on first-party webpage 206 (e.g., an embedded image or video, etc.) or in conjunction with first-party webpage 206 (e.g., in a pop-up window or tab, etc.). For example, content selection service 104 may select third-party content 218 to be included on webpage 206. In some implementations, one or more content tags may be embedded into the code of webpage 206 that defines a content field located at the position of third-party content 218. Another content tag may cause web browser 200 to request additional content from content selection service 104, when first-party webpage 206 is loaded. Such a request may include one or more keywords, a device identifier for client device 102, or other data used by content selection service 104 to select content to be provided to client device 102. In response, content selection service 104 may select third-party content 218 for presentation on first-party webpage 206.

Content selection service 104 may select third-party content 218 (e.g., an ad) by conducting a content auction, in some implementations. Content selection service 104 may also determine which third-party content providers compete in the auction based in part on campaign parameters set by the providers. For example, only content providers that specified a topic that matches that of webpage 206, an interest category of a device identifier accessing webpage 206, or webpage 206 specifically may compete in the content auction. Based on bidding parameters for these third-party content providers, content selection service 104 may compare their bid amounts, quality scores, and/or other values to determine the winner of the auction and select third-party content 218 for presentation with webpage 206.

In some implementations, content selection service 104 may provide third-party content 218 directly to client device 102. In other implementations, content selection service 104 may send a command to client device 102 that causes client device 102 to retrieve third-party content 218. For example, the command may cause client device 102 to retrieve third-party content 218 from a local memory, if third-party content 218 is already stored in memory 114, or from a networked content source. In this way, any number of different pieces of content may be placed in the location of third-party content 218 on first-party webpage 206. In other words, one user that visits first-party webpage 206 may be presented with third-party content 218 and a second user that visits first-party webpage 206 may be presented with different content. Other forms of content (e.g., an image, text, an audio file, a video file, etc.) may be selected by content selection service 104 for display with first-party webpage 206 in a manner similar to that of third-party content 218. In further implementations, content selected by content selection service 104 may be displayed outside of first-party webpage 206. For example, content selected by content selection service 104 may be displayed in a separate window or tab of web browser 200, may be presented via another software application (e.g., a text editor, a media player, etc.), or may be downloaded to client device 102 for later use.

Third-party content 218 may be interactive content. In other words, the user of client device 102 may interact with third-party content 218 via an interface device. For example, third-party content 218 may be clickable (e.g., via a mouse, touch screen, etc.) and hotlinked to a landing webpage of the third-party content provider. In various implementations, webpage 206, third-party content 218, and/or the landing webpage may be configured to cause client device 102 to report a content interaction with third-party content 218 to content selection service 104 and/or to online service 130. In one implementation, webpage 206 and the landing webpage may include pixel tags that allows content selection service 104 to set a cookie on client device 102 and cause client device 102 to report the cookie back to content selection service 104 when the landing webpage is loaded. In another implementation, assume that client device 102 is logged into an account of online service 130 and the landing webpage includes code that cases client device 102 to report that the user of client device 102 clicked on third-party content 218 and was redirected to the hotlinked webpage of the third-party content provider. Online service 130 may then provide the recorded data to content selection service 104. Thus, content selection service 104 may receive data regarding interactions with third-party content 218 by users that are presented the content. If a user is also logged into an account with online service 130, content selection service 104 may also associate the content interaction with the account.

Figure 2B:
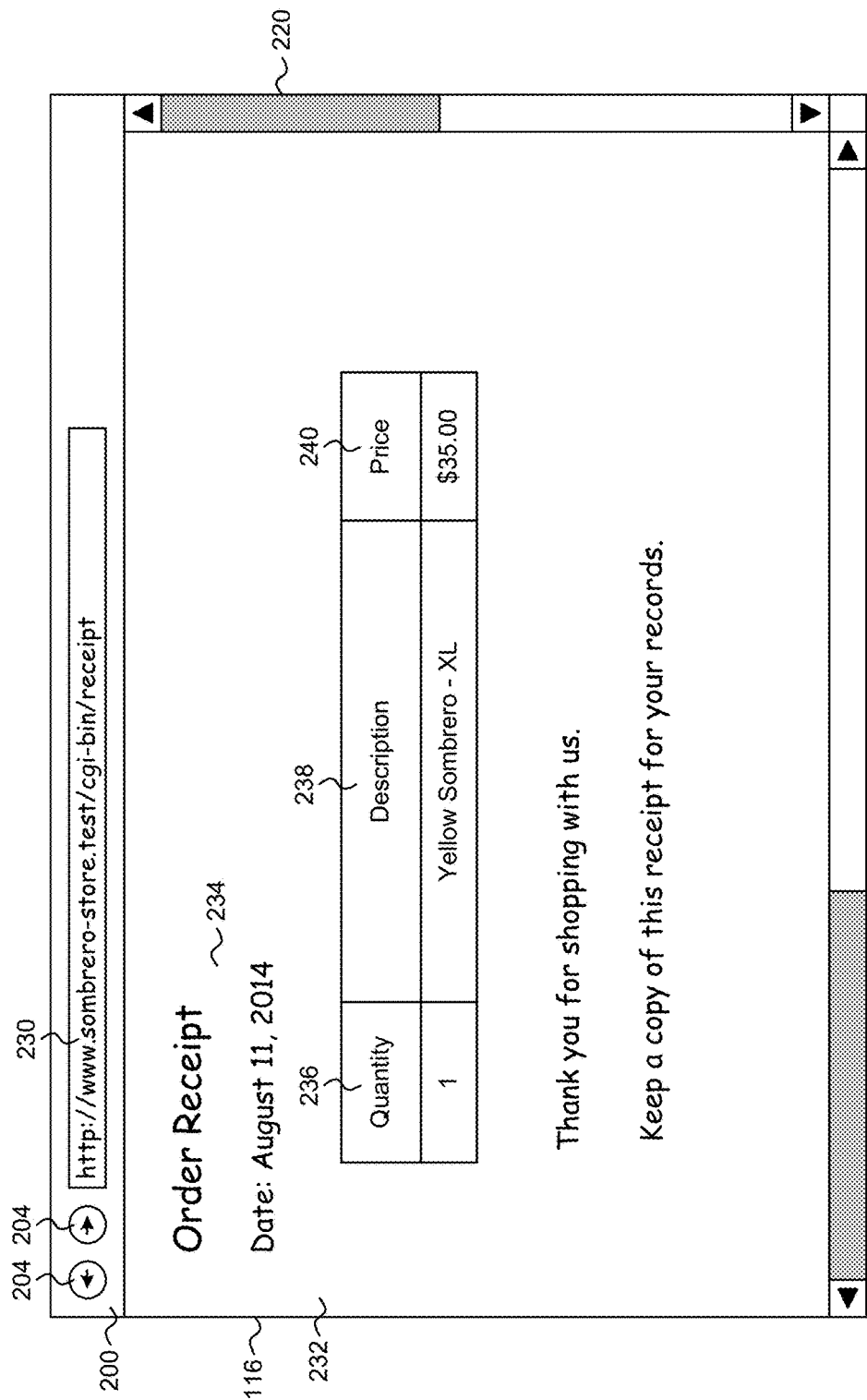
FIG. 2B is an illustration of one implementation of an electronic display showing the completion of a conversion.

Referring now to FIG. 2B, an illustration is shown of one implementation of an electronic display showing the completion of a conversion. As shown, webpage 232 may be an order confirmation webpage representing the final step of a conversion (e.g., a purchase was made). Webpage 232 may include text 234 indicating that the webpage includes an order receipt for a recent purchase. Webpage 232 may also include order details, such as a quantity 236 of a purchased item, a description 238 of the purchased item, a total purchase price 240 for the item, or the like.

Also as shown, webpage 232 may be part of the website hotlinked to third-party content 218 shown in FIG. 2A. For example, third-party content 218 may be hotlinked to the merchant website located at the domain, http://www.sombrero-store.test, as entered into field 230. Some or all of the webpages of the website may be configured to cause the device to report back visits made to the various webpages to online service 130 and/or to content selection service 104. For example, webpage 232 may include instructions that cause the accessing device to report the visit to webpage 232 to online service 130. If the device is also logged into an account of online service 130 at the time, online service 130 may associate the visit to webpage 232 and the completion of a conversion with the account.

In one implementation, webpage 232 is accessed by the same device as webpage 206 shown in FIG. 2A (e.g., client device 102 accesses both webpages). Since the same device was used to click on third-party content 218 and to complete a purchase on the hotlinked website, i.e., a conversion, this form of conversion is a single device conversion. Content selection service 104 may use the recorded conversion to generate performance metrics for third-party content 218, such as a conversion rate, a cost per conversion, or the like.

In another implementation, webpage 232 is accessed by a different device than the device that accessed webpage 206 in FIG. 2A. For example, assume that webpage 206 was accessed by client device 102 and that webpage 232 was accessed by client device 103. If both devices 102 and 103 were logged into the same account with online service 130 at the times webpages 206 and 232 were accessed, content selection service 104 may link these events to attribute the conversion completed on webpage 232 to the presentation of third-party content 218 on webpage 206. This type of conversion is considered to be a cross-device conversion, since the desired user action (e.g., completing a purchase on the provider's website) was performed using a different device than the device that was presented third-party content 218. In some implementations, content selection service 104 may impose a time limit between events, to attribute a purchase to the presentation of third-party content. For example, content selection service 104 may only attribute the purchase to third-party content 218 if the purchase was completed within an hour, several hours, a day, etc., after third-party content 218 was presented on client device 102. After a predefined amount of time has elapsed, the purchase may be considered to be unrelated to the presentation of third-party content 218 by client device 102.

Figure 3:
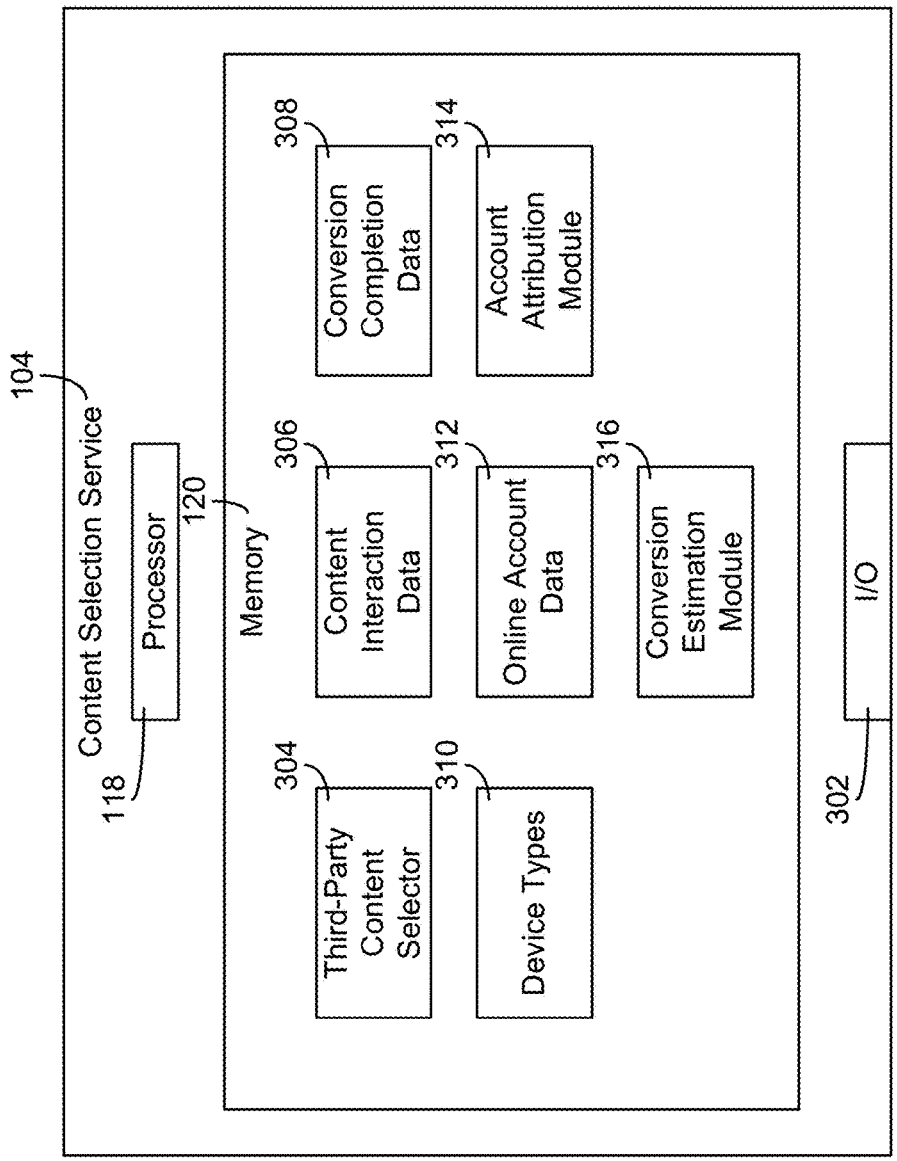
FIG. 3 is a detailed block diagram of the content selection service of FIG. 1, according to various implementations.

Referring now to FIG. 3, a detailed block diagram of the content selection service 104 of FIG. 1 is shown, according to various implementations. As shown, content selection service 104 may include a number of hardware components in electronic communication with one another configured to generate and provide an earnings alert to a first-party content provider. For example, content selection service 104 may include input and/or output (I/O) hardware 302 in electronic communication with processor 118 that is configured to receive data from another computing device (e.g., an indication of an interaction with third-party content by a client device, account settings from content providers, etc.) and/or provide data to another computing device (e.g., an earnings warning, etc.) via network 106. Content selection service 104 may also include various software modules in memory 120 that, when executed by processor 118, cause processor 118 to perform the functions described herein.

Memory 120 may include a content selector 304 that is configured to select third-party content for presentation in conjunction with first-party content. In some implementations, content selector 304 may receive a content selection request via I/O hardware 302 from a client device accessing the first-party content or from the source of the first-party content itself. For example, content selector 304 may receive a content selection request from a client device in response to the client device executing a content tag embedded into a first-party webpage accessed by the client device. In response, content selector 304 may determine which piece or pieces of third-party content are to be presented with the first-party webpage.

Content selector 304 may base a content selection on any number of factors. In some implementations, content selector 304 may conduct a content auction in which bids are placed on behalf of third-party content providers. Such bids may be specified directly by the third-party content providers or generated automatically by content selector 304 based on auction parameters specified by the third-party content providers. For example, a third-party content provider may specify a minimum, maximum, or target bid as part of an ad campaign. In another example, a third-party content provider may select a bidding strategy to achieve a particular goal (e.g., to maximize the number of impressions, clicks, conversions, etc. for the third-party content provider's content). In a further example, bids may be generated by content selector 304 on behalf of a third-party content provider based on a specified budget (e.g., a daily budget, a weekly budget, etc.). In other implementations, content selector 304 may select third-party content based on an agreement between the first-party content provider and a third-party content provider in which the third-party content provider is allowed to place content with the first-party content for a specified amount of time (e.g., a particular ad may be shown on the first-party provider's website for a week).

In some implementations, content selector 304 may be configured to determine whether certain third-party content is even eligible for selection for a particular piece of first-party content. For example, content selector 304 may base the eligibility of third-party content for selection on parameters set by either or both of the first and third-party content providers. In one implementation, the first-party content provider may set parameters that control which types of third-party content are eligible for presentation with the first-party content (e.g., the topics of third-party content that are prohibited or eligible for selection, whether third-party content related to a user interest category is eligible for selection, etc.). In a further implementation, the third-party content provider may specify parameters that control the types of devices for which their content is eligible for selection (e.g., desktop devices, mobile devices, specific hardware or software device configurations, etc.), the geographic locations of eligible devices, user interest categories, or the like. Thus, content selector 304 may determine whether a piece of third-party content is even eligible for selection for a particular client device or with a particular piece of first-party content before generating an auction bid on behalf of the third-party content provider.

In one implementation, content selector 304 may base the selection of third-party content on one or more quality scores. In general, a quality score may represent the likelihood of a user interacting with a piece of third-party content (e.g., clicking on the content, playing the content, etc.), how closely a third-party website hyperlinked to the third-party content relates to the third-party content, how closely a topic of the third-party content matches a topic of the first-party content, or combinations thereof. In some cases, content selector 304 may combine a quality score with a generated auction bid for a third-party content provider, to determine whether content from the provider is selected for presentation. For example, content selector 304 may add a quality score and an auction bid for a third-party content provider to determine an overall score and compare overall scores among providers, to select third-party content. Thus, the third-party content provider having a high auction bid, but a low quality score, may not be guaranteed that his or her content will be selected by content selector 304.

Memory 120 may store content interaction data 306 received via I/O hardware 302 from the client devices that presented the third-party content selected by content selector 304 and/or from online service 130. Content interaction data 306 may generally include any data indicative of the third-party content having been interacted with by a user interface device. For example, content interaction data 306 may include data indicative of the third-party content being clicked or otherwise selected (e.g., via a touch screen, via a voice command, via a recognized position of a user's eye, etc.) at the device that presents the third-party content. Content interaction data 306 may also include timestamp information indicative of when a content interaction occurred and/or a device identifier for the device. For example, content interaction data 306 may include data indicative of a third-party content ad being clicked at a particular mobile device represented by a cookie.

Memory 120 may store conversion completion data 308 received via I/O hardware 302 from online service 130 and/or directly from client devices. Conversion completion data 308 may include data indicative of any form of specified online action being performed, such as the completion of an online purchase, signing up for a marketing list, creating an account, downloading software, or any other form of action. In some cases, conversion completion data 308 may include data indicative of the steps taken to complete a conversion. For example, conversions completion data 308 may include data indicative of the webpages navigated to arrive at a purchase completion webpage. Similar to content interaction data 306, conversion completion data 308 may include timestamp and/or device identifier information to indicate when a conversion was completed and/or the device that completed the conversion.

Memory 120 may include online account data 312 received from online service 130 via I/O hardware 302.

Online account data 312 may include unique identifiers for the accounts registered with online service 130. For example, online account data 312 may include a listing of screen names, logins, or the like. In some cases, the actual screen names or other information may be anonymized prior to being stored in online account data 312 to provide another layer between the actual identity of users and the data used by content selection service 104. Online account data 312 may be associated with some or all of content interaction data 306 and/or conversion completion data 308. In cases in which a client device was logged into an account of online service 130 during a content interaction, during the completion of a conversion, or the performance of any actions in between, an identifier for the account in online account data 312 may be associated with any corresponding data in content interaction data 306 or conversion completion data 308.

In one implementation, memory 120 includes device types 310. Device types 310 may include any predefined classifications of client devices, such as mobile devices, tablet devices, desktop devices, or the like. Device types 310 may be associated with content interaction data 306 and conversion completion data 308, thereby allowing performance metrics for third-party content to be divided along the different device types. In one implementation, device types 310 may also include data associated with online account data 312, such as the relative number of devices of one type logged into the same accounts as another type of devices. For example, device types 310 may include a statistic that 15% of tablet devices are logged into the same online accounts as desktop devices.

In various implementations, memory 120 may include an account attribution module 314. Account attribution module 314 may be configured to use online account data 312 and device types 310 to associate content interactions in content interaction data 306 with completed conversions in conversion completion data 308 across different device types. In other words, account attribution module 314 may be configured to identify cross-device conversions observed from content interaction data 306 and conversion completion data 308 based on both devices being logged into the same account with online service 130 at the time. In one implementation, account attribution module 314 may only look to the last interaction for a conversion. For example, assume that the following events occurred: mobile click→desktop click→desktop conversion by devices logged into the same online account. In such a case, account attribution module 314 may classify the conversion as a desktop→desktop conversion, since the last click on the third-party content occurred on the desktop device (e.g., the third-party content was provided to both the user's mobile device and the user's desktop device).

Account attribution module 314 may also impose a time limit to associate a content interaction in content interaction data 306 with a completed conversion in conversion completion data 308. For example, only conversions that were completed within an hour, several hours, a day, a week, or any other predefined amount of time from a click on the third-party content, may be associated with the click. In some cases, account attribution module 314 may also identify cross-device conversions across devices of the same type. For example, account attribution module 314 may identify cross-device conversions across two or more desktop devices, if different web browsers are used to interact with the third-party content and to complete a conversion or if different computer are used.

Account attribution module 314 may further be configured to remove duplicate conversions identified as both single device conversions and cross-device conversions. Such a situation may occur, for example, if device identifiers (e.g., cookies) are used in addition to online accounts to identify conversions. In these situations, account attribution module 314 may attribute the conversion to the same device, even if the last content interaction occurred on a different device. While the type of conversion may be skewed one way or the other during de-duplication (e.g., as a single device conversion or as a cross-device conversion), the conversion will only be counted once.

Memory 120 may also include a conversion estimation module 316 configured to estimate a total number of cross-device conversions based on the number of observed cross-device conversions identified by account attribution module 314 and based on device types 310. In other words, conversion estimation module 316 may extrapolate out the number of observed cross-device conversions using an observed percentage of one device type being logged into the same online accounts as another device type. In one implementation, conversion estimation module 316 may determine an estimated total number of cross-device conversions (cross-device_conversions$_{est}$) associated with the third-party content of a provider as follows:

$$\text{cross-device\_conversions}_{est} = \text{cross-device\_conversions}_{observed} * (100/X\%)$$

where cross-device_conversions$_{observed}$ is the number of cross-device conversions observed across a first and second device type and X% is the percentage of the first device type observed to be signed into the same accounts as the second device type. For example, if cross-device_conversions$_{observed}$=10 and X%=10.5 (e.g., 10.5% of one device type are observed to log into the same accounts as devices of a second device type), then the estimated total number of cross-device conversions is 95.2.

Conversion estimation module 316 may be configured to determine an estimated total number of conversions, in one implementation. Conversion estimation module 316 may determine an estimated total number of conversions as follows:

$$\text{conversions}_{est} = \text{cross-device\_conversions}_{est} + \text{conversions}_{device1}$$

where cross-device_conversions$_{est}$ is the estimated total number of cross-device conversions and conversions$_{device1}$ is number of observed conversions from the first device type alone.

Conversion estimation module 316 may provide any generated performance metrics (e.g., the number of observed cross-device conversions, the number of estimated cross-device conversions, the estimated total number of conversions, etc.) via I/O hardware 302 to a device associated with a third-party content provider. In one implementation, the performance metrics may be part of a performance report for a campaign or other grouping of third-party content from the provider. For example, a third-party content provider may review the performance of his or her ad campaign using the metrics generated by conversion estimation module 316.

Figure 4:
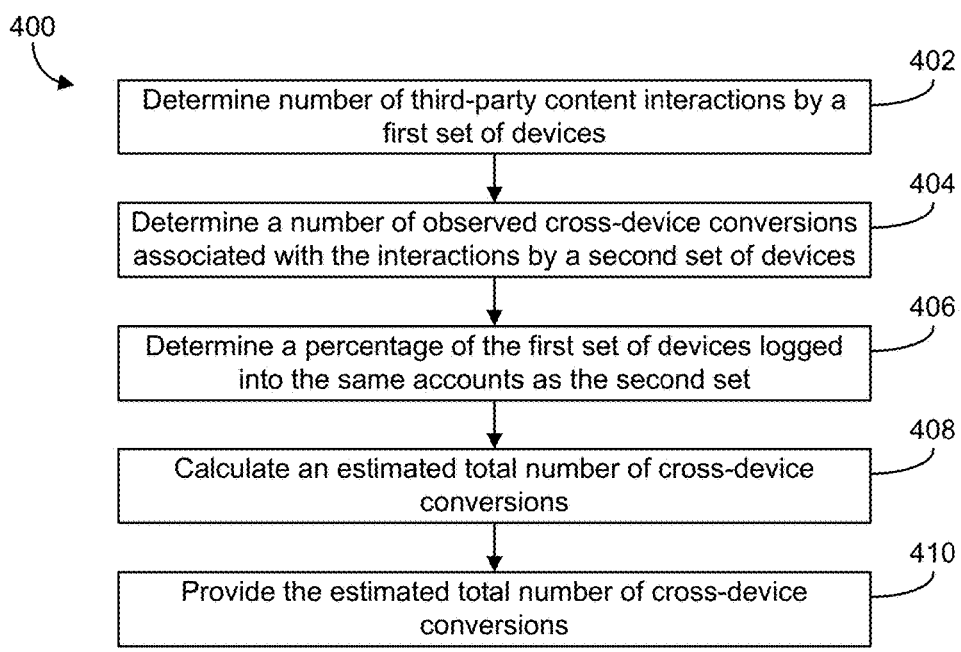
FIG. 4 is a flow diagram of the steps taken in one implementation of a process for estimating cross-device conversions.

Referring now to FIG. 4, a flow diagram of the steps taken in one implementation of a process 400 for estimating cross-device conversions. Process 400 generally includes determining a number of third-party content interactions by a first set of devices (step 402), determining a number of observed cross-device conversion associated with a second set of devices (step 404), determining a percentage of the first set of devices logged into the same accounts as the second set (step 406), calculating an estimated total number of cross-device conversions (step 408), and providing the estimated total number of cross-device conversions (step 410). Process 400 may be implemented by one or more computing devices executing stored machine instructions. For example, process 400 may be implemented by content selection service 104 shown in detail in FIG. 3. In general, process 400 allows a third-party content provider to review the estimated performance of his or her third-party content, such as part of an ad campaign.

Referring still to the implementation of FIG. 4, process 400 includes determining a number of third-party content interactions by a first set of devices (step 402). The first set of devices may be any set of client devices at which the third-party content was presented. In some cases, the first set of devices may be devices of the same type, such as desktop devices, tablet devices, mobile devices, or the like. The content interactions may be any form of action performed relative to the third-party content using a user interface device. For example, the content interactions may correspond to the number of times the third-party content was clicked or otherwise selected at the client devices. In various implementations, the third-party content interactions may be determined based on code inserted into webpages that cause the client devices to report on which webpages associated with the third-party content are visited by the devices. For example, webpage code on a landing page associated with the third-party content may cause a client device to report a cookie or other device identifier to the content selection service. In another example, the webpage code may cause the device to report the navigation to the landing webpage to an online service.

Referring still to the implementation of FIG. 4, process 400 includes determining a number of observed cross-device conversions associated with the interactions that were completed by a second set of devices (step 404). Similar to the webpage code that causes client devices to report navigations to the landing webpage of the third-party content (e.g., when the third-party content is clicked), a webpage corresponding to the completion of a conversion may include similar code. In cases in which the content interactions and the completions of the conversions are reported to an online service (e.g., an email service, a social networking service, etc.), both events may be associated with one another based on the two devices being logged into the same account. For example, assume that the first set of devices are mobile devices that receive selected ads and that the second set of devices are desktop devices at which purchases are made on the ad's website. In such a case, clicks on the ad at the mobile devices may be associated with the completed conversions at the desktop devices, if both devices are logged into the same online account when both events occur. In some implementations, a time limit may be imposed in order for a content interaction on one device type to be associated with the completion of a conversion on another device type.

Referring yet still to the implementation of FIG. 4, process 400 includes determining a percentage of the first set of devices that have logged into the same online accounts as the devices in the second set (step 406). The percentage may be based solely on the devices that actually received the third-party content being analyzed or may be based on an average across all devices of that type. For example, the online service may determine that, on average, 10% of mobile devices that log into accounts on the service have corresponding tablet devices that have logged into the same accounts. In another example, the online service may determine that 15% of the mobile devices that received the third-party content logged into the same account as tablet devices.

Still referring to the implementation of FIG. 4, process 400 includes calculating an estimated total number of cross-device conversions (step 408). In one implementation, the estimated total number of cross conversions may be determined by extrapolating out the number of observed cross-device conversions based on the percentage of the first set of devices that have logged into the same accounts as the second set. For example, assume that 10 mobile→desktop cross-device conversions are observed and that 10.5% of mobile devices have logged into the same accounts as desktop devices. In such a case, the estimated number of cross-device conversions may be 95.2 (e.g., 10*100/10.5=95.2).

Yet still referring to the implementation of FIG. 4, process 400 includes providing the estimated total number of cross-device conversions (step 410). In one implementation, the total number of cross-device conversions estimated in step 408 are provided to a third-party content provider, such as part of a performance report for a campaign of the provider. In other implementations, the estimated total number of cross-device conversions may be provided to a module configured to determine another performance metric, such as an estimated total number of conversions (e.g., single and cross-device conversions), an estimated conversion rate, or the like.

Figure 5:
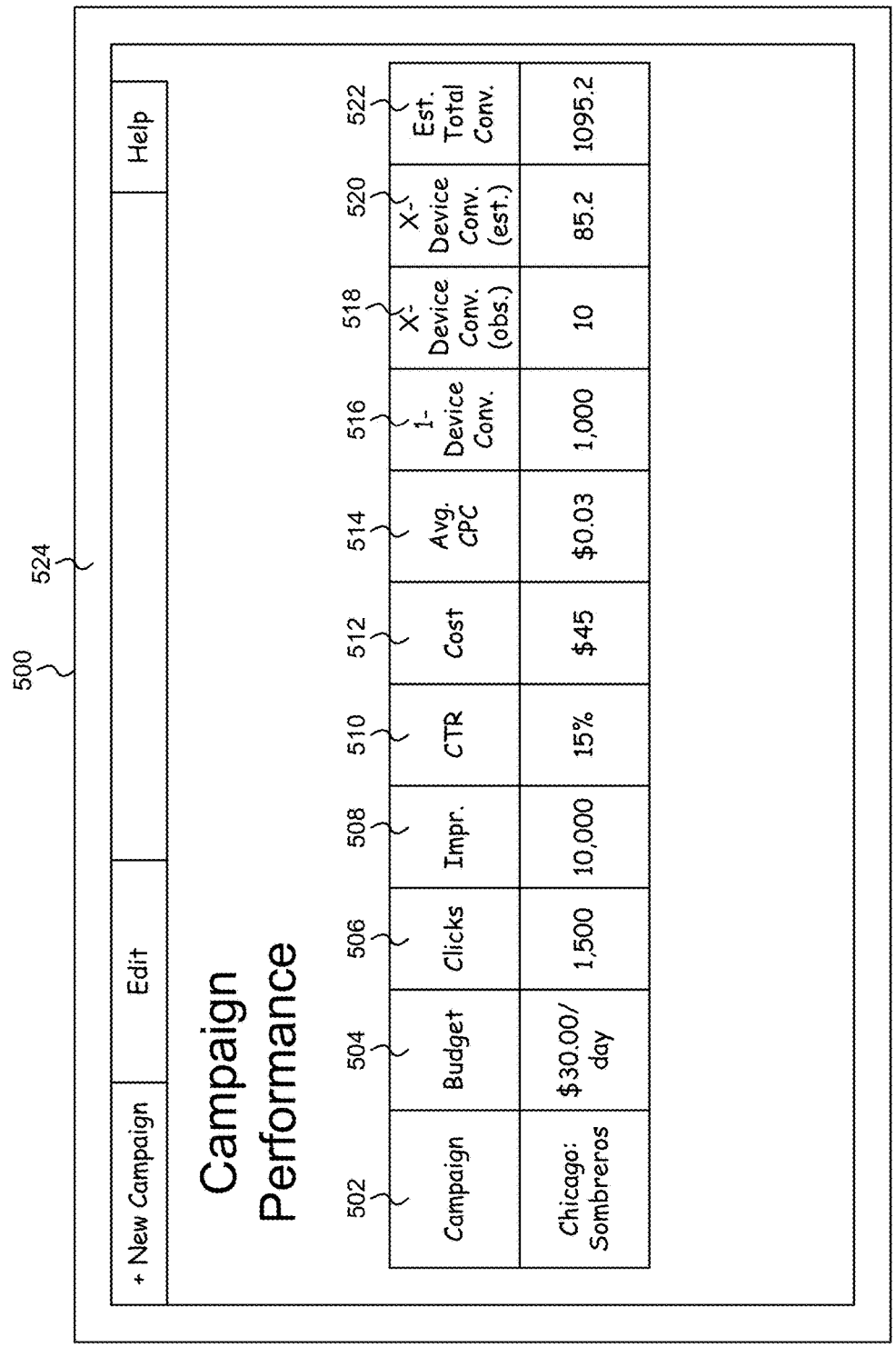
FIG. 5 is an illustration of one implementation of a performance report for a third-party content provider being displayed on an electronic display.

Referring now to FIG. 5, an illustration is shown of one implementation of a performance report 524 for a third-party content provider being displayed on an electronic display 500. Performance report 524 may be a webpage or a portion of a webpage provided by a content selection service used by the provider to send third-party content to devices. In some cases, performance report 524 may be part of a stand-alone application that receives performance metrics from the content selection service. In yet further implementations, the device having electronic display 500 may calculate the performance metrics using raw data from the content selection service.

As shown in the implementation of FIG. 5, performance report 524 may identify one or more campaigns 502 created by the third-party content provider. For example, an online merchant that sells hats may create a campaign for sombreros to devices located around Chicago. Associated with the campaigns may be various data that can be displayed as part of performance report 524. For example, a daily budget 504 may be displayed on performance report 524 for campaigns 502, if such a budget has been specified. Performance metrics regarding the campaigns may also be displayed on performance report 524. For example, the number of times the third-party content in the campaign was presented as client devices may be shown as impressions 508. Similarly, the number of times the presented content was clicked at those devices may be shown on performance report 524 as clicks 506 (e.g., a click count). Based on the number of impressions and clicks, a click through rate ("CTR") 510 may be calculated and presented on performance report 524. Likewise, the total costs 512 for the clicks and/or an average cost per click ("CPC") 514 may be calculated and presented as part of performance report 524. In various implementations, the number of single device conversions 516 for a campaign may be determined and presented as part of performance report 524. Performance report 524 may also include the number of cross-device conversions 518 that were observed, the estimated total number of cross-device conversions 520, and/or the estimated total number of conversions 522 (e.g., single and cross-device conversions).

Performance report 524 may be a predefined report or may be altered to show other performance metrics or other data than those depicted in fields 504-522. For example, the estimated total number of conversions 522 may only be shown in performance report 524 if the third-party content provider adds this field to the report. In various other implementations, some or all of fields 504-522 may be hidden from the provider. For example, the third-party content provider may be able to review the total estimated number of conversions, but not the estimated number of cross-device conversions.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system of multi-computing device network based conversion determination based on computer network traffic, comprising:

a content selection computer server that identifies a computer network based cross-device conversion associated with a first client computing device of a first set of client computing devices and a second client computing device of a second set of client computing devices, the first client computing device having accessed third party content associated with a third party content provider via a first computer network connection and the second client computing device having accessed a webpage of the third-party content provider associated with the third party content via a second computer network connection, the first client computing device and the second client computing device both logged into a same online account;

the content selection computer server obtains, via a content tag that includes a script that executes on a webpage that includes the third party content, data indicating that the first client computing device accessed the third-party content;

the content selection computer server determines the computer network based cross-device conversion based on the data obtained via the content tag, based on the second client computing device having accessed the webpage of the third-party content provider, and based on the first client computing device and the second client computing device both logged into the same online account;

the content selection computer server determines a percentage of the first set of client computing devices and the second set of client computing devices that have logged into common respective online accounts;

the content selection computer server determines, with an extrapolation technique, an estimated number of computer network based cross-device conversions based on the computer network based cross-device conversion associated with a first client computing device and the second client computing device, and based on the percentage of the first set of client computing devices and the second set of client computing devices that have logged into common respective online accounts; and the content selection computer server provides an indication of the estimated number of computer network based cross-device conversions via a computer network to a third party content provider computing device for display by an electronic display of the third party content provider computing device.

2. The system of claim 1, wherein the script executes at the second client computing device.

3. The system of claim 1, comprising:
the content selection computer server configured to determine an estimated total number of conversions for the third-party content based on the estimated number of computer network based cross-device conversions and based on a known number of computer network based cross-device conversions for the first set of client computing devices and the second set of client computing devices.

4. The system of claim 1, comprising:
the content selection computer server configured to determine a number of selections of the third-party content by the first set of client computing devices.

5. The system of claim 1, wherein the same online account includes at least one of an account for a social networking service, an account for an email service, an account for a file sharing service, and an account for a search service.

6. The system of claim 1, wherein the first set of client computing devices and the second set of client computing devices include different types of devices.

7. The system of claim 6, wherein the different types of devices include mobile devices, tablet devices, or desktop devices.

8. The system of claim 1, comprising:
the content selection computer server configured to associate the first client computing device with the second client computing device.

9. A method of multi-computing device network based conversion determination based on computer network traffic, comprising:
identifying, by a content selection computer server, a computer network based cross-device conversion associated with a first client computing device of a first set of client computing devices and a second client computing device of a second set of client computing devices, the first client computing device having accessed third party content associated with a third party content provider via a first computer network connection and the second client computing device having accessed a webpage of the third-party content provider associated with the third party content via a second computer network connection, and the first client computing device and the second client computing device both logged into a same online account;
obtaining, by the content selection computer server, via a content tag associated with a script that executes on a webpage that includes the third party content, data indicating that the first client computing device accessed the third-party content;
determining, by the content selection computer server, the computer network based cross-device conversion based on the data obtained via the content tag, and based on the second client computing device having accessed the webpage of the third-party content provider;
determining, by the content selection computer server, a percentage of the first set of client computing devices and the second set of client computing devices that have logged into common respective online accounts;
determining, by the content selection computer server, using an extrapolation technique, an estimated number of computer network based cross-device conversions based on the computer network based cross-device conversion associated with a first client computing device and the second client computing device, and based on the percentage of the first set of client computing devices and the second set of client computing devices that have logged into common respective online accounts; and
providing, by the content selection computer server, an indication of the estimated number of computer network based cross-device conversions via a computer network to a third party content provider computing device for display by an electronic display of the third party content provider computing device.

10. The method of claim 9, wherein the script executes at the second client computing device.

11. The method of claim 9, comprising:
the content selection computer server configured to determine an estimated total number of conversions for the third-party content based on the estimated number of computer network based cross-device conversions and based on a known number of computer network based cross-device conversions for the first set of client computing devices and the second set of client computing devices.

12. The method of claim 9, comprising:
determining a number of selections of the third-party content by the first set of client computing devices.

13. The method of claim 9, wherein the same online account includes at least one of an account for a social networking service, an account for an email service, an account for a file sharing service, and an account for a search service.

14. The method of claim 9, wherein the first set of client computing devices and the second set of client computing devices include different types of devices.

15. The method of claim 14, wherein the different types of devices include mobile devices, tablet devices, or desktop devices.

16. The method of claim 9, comprising:
associating the first client computing device with the second client computing device.

17. A computer-readable storage medium having machine instructions stored therein, the instructions being executable by a processor to cause the processor to perform operations for multi-computing device network based conversion determination based on computer network traffic, the operations comprising:
identifying a computer network based cross-device conversion associated with a first client computing device of a first set of client computing devices and a second client computing device of a second set of client computing devices, the first client computing device having accessed third party content associated with a third party content provider via a first computer network connection and the second client computing device having accessed a webpage of the third-party content provider associated with the third party content via a second computer network connection, and the first client computing device and the second client computing device both logged into a same online account;
obtaining via a content tag associated with a script that executes on a webpage that includes the third party content, data indicating that the first client computing device accessed the third-party content;

determining the computer network based cross-device conversion based on the data obtained via the content tag, and based on the second client computing device having accessed the webpage of the third-party content provider;

determining a percentage of the first set of client computing devices and the second set of client computing devices that have logged into common respective online accounts;

determining using an extrapolation technique, an estimated number of computer network based cross-device conversions based on the computer network based cross-device conversion associated with a first client computing device and the second client computing device, and based on the percentage of the first set of client computing devices and the second set of client computing devices that have logged into common respective online accounts; and providing an indication of the estimated number of computer network based cross-device conversions via a computer network to a third party content provider computing device for display by an electronic display of the third party content provider computing device.

18. The computer-readable storage medium of claim 17, the operations comprising:

determining an estimated total number of conversions for the third-party content based on the estimated number of computer network based cross-device conversions and based on a known number of computer network based cross-device conversions for the first set of client computing devices and the second set of client computing devices.

19. The computer-readable storage medium of claim 17, the operations comprising:

determining a number of selections of the third-party content by the first set of client computing devices.

20. The computer-readable storage medium of claim 17, the operations comprising:

associating the first client computing device with the second client computing device.

* * * * *